(12) United States Patent (10) Patent No.: US 12,650,143 B2
Klein (45) Date of Patent: Jun. 9, 2026

(54) HIDDEN RECESS FURNITURE SCREW AND DRIVER SYSTEM

(71) Applicant: Andrew J. Klein, Parker, CO (US)

(72) Inventor: Andrew J. Klein, Parker, CO (US)

( * ) Notice: Subject to any disclaimer, the term of this patent is extended or adjusted under 35 U.S.C. 154(b) by 357 days.

(21) Appl. No.: 18/538,569

(22) Filed: Dec. 13, 2023

(65) Prior Publication Data

US 2024/0133418 A1    Apr. 25, 2024

Related U.S. Application Data

(63) Continuation-in-part of application No. 17/722,043, filed on Apr. 15, 2022, now abandoned.

(60) Provisional application No. 63/176,020, filed on Apr. 16, 2021.

(51) Int. Cl.
   *F16B 23/00* (2006.01)
   *F16B 12/14* (2006.01)
   *F16B 35/06* (2006.01)
(52) U.S. Cl.
   CPC .............. *F16B 35/06* (2013.01); *F16B 12/14* (2013.01); *F16B 23/0007* (2013.01)
(58) Field of Classification Search
   CPC .............. F16B 23/0007; F16B 23/0015; F16B 23/0023; F16B 37/14; F16B 35/06
   USPC .......................... 411/402–405, 373–378, 407
   See application file for complete search history.

(56) References Cited

U.S. PATENT DOCUMENTS

| | | | |
|---|---|---|---|
| 2,133,409 A | 10/1938 | Webb | |
| 2,331,608 A * | 10/1943 | Hathorn | F16B 23/0076 |
| | | | 470/9 |
| 2,555,197 A | 5/1951 | Lasky | |
| 3,405,595 A | 10/1968 | Peterson | |
| 4,822,227 A | 4/1989 | Duran | |
| 4,911,593 A * | 3/1990 | Kephart | F16B 23/0038 |
| | | | 411/407 |
| 5,074,730 A | 12/1991 | Duran | |
| 5,582,548 A * | 12/1996 | Czegledi | B21K 1/463 |
| | | | 411/407 |
| 5,868,049 A * | 2/1999 | Kanwal | F16B 23/0007 |
| | | | 81/460 |
| 2006/0086213 A1 | 4/2006 | Wu | |
| 2011/0314975 A1* | 12/2011 | Steinert | F16B 23/0007 |
| | | | 81/442 |
| 2016/0221162 A1 | 8/2016 | Sun | |

FOREIGN PATENT DOCUMENTS

CA          2809884 A1 *    5/2013    ........... B25B 15/005

* cited by examiner

*Primary Examiner* — Flemming Saether
(74) *Attorney, Agent, or Firm* — Westman, Champlin & Koehler, P.A.; Amanda M. Prose

(57) ABSTRACT

A fastener and a specialized driver, the fastener comprising a fastener head with aperture centered therein and fastener body extending from connection with the fastener head. The fastener body has an interior cavity along a length of the fastener body and a spring biased plunger is slidable within an interior cavity of the fastener body between a first position where the plunger has a surface configured to fit within the aperture and in a second position the plunger is spaced apart from the aperture. The driver is removably coupleable to the fastener to depress the plunger and transfer torque to the fastener for installation without damage to the fastener.

6 Claims, 6 Drawing Sheets

SECTION A-A

DETAIL X

HIDDEN RECESS FURNITURE SCREW AND DRIVER SYSTEM

CROSS-REFERENCE TO RELATED APPLICATIONS

This application is a continuation in part of U.S. application Ser. No. 17/722,043, filed on Apr. 15, 2022 and is based on and claims the benefit of U.S. provisional application Ser. No. 63/176,020, filed Apr. 16, 2021, the contents of which are hereby incorporated in their entirety.

BACKGROUND

The present invention relates to a decorative screw fastener. More specifically this disclosure relates to a screw fastener that displays an unbroken flat disc because the driver recess is only revealed when a specialized driver depresses a center plunger, and locks into place with magnets. In this way a decorative aesthetic is achieved while the functionality of a screw fastener is maintained.

Numerous decorative fasteners for furniture exist, but none of these fasteners present a flat unbroken circular top when installed as such a fastener has no surface for a driver to couple to or connect with.

SUMMARY

An aspect of the present disclosure relates to a fastener system comprising a fastener head having an aperture therein for receiving a head of a plunger; a fastener body having an externally threaded length and an open cavity along a length thereof; a driver having driver head with a protrusion thereon with dimensions of the protrusion substantially matching dimensions of the aperture in the fastener head and the driver having an undercut portion between the driver head and protrusion thereof allowing for transfer of torque from the driver to the fastener head without damage thereto, wherein the plunger head is slidable within a depth of the aperture of the fastener head from a first position wherein a top surface of the head of the plunger is flush with a top surface of the fastener head thus obscuring the aperture in the fastener head and a second position wherein the top surface of the head of the plunger is below the top surface of the fastener head.

The aperture in the fastener head has a chamfer along a perimeter thereof.

A perimeter of the head of the plunger has a chamfer there along and wherein in the head of the plunger and the aperture in the fastener meet at the respective chamfers.

The fastener comprising a spring for biasing the plunger, the spring having a first length positioned within a portion of the open cavity along the length of the fastener body.

A second length of the spring is coupled to a base of the plunger.

The threaded length of the fastener body is fixedly secured to the fastener head with the cavity in the fastener body aligned with the aperture in the fastener head.

Another aspect of the present disclosure relates to a method of using a fastener comprising contacting a driver head of a driver with the fastener and moving a plunger head of the fastener from a first position within the fastener head to a second position within the fastener head; and rotating the driver and transferring torque from the driver head to the fastener head to rotate the fastener head and fastener body coupled thereto, wherein the driver head has an undercut surface between the driver head and driver body for preventing damage to the fastener when rotating the driver.

Sliding the plunger head along an aperture in the fastener head providing an interior cavity having a length along the fastener head such that in the first position the plunger head is flush with a top surface of the fastener head and in the second position the plunger head is below the top surface of the fastener head.

The driver head, the plunger head, and the aperture in the fastener head have substantially identical dimensions to one another allowing the driver head to depress the plunger head into the aperture.

The driver head has dimensions sufficient for the driver head to depress the plunger head within an interior cavity in the fastener head and contacting a side wall of the driver head with a side wall of the fastener head for transferring torque from the driver head to the fastener head and fastener body coupled thereto.

The undercut surface allows the driver to be inserted into the interior cavity and rotate the fastener head at an angle without damaging the fastener head.

Yet another aspect of the present disclosure relates to a method of making a hidden recess fastener comprising coupling an externally threaded rod to an internally threaded length of an aperture in a fastener head; inserting a spring and a plunger between the externally threaded rod and fastener head; pressing the plunger against a back side of the fastener head and at least partially through an aperture in the fastener head by screwing the threaded rod into the fastener head until the threaded rod contacts the plunger and biases the plunger firmly into the fastener head and at least partially through the aperture in the fastener head; grinding the fastener head and plunger passing through the aperture concurrently; and releasing the plunger from contact with the threaded rod and at least partially unscrewing the threaded rod from the fastener head until an overall length of the fastener meets a predetermined specification of the fastener.

Aligning one or more grooves in the threaded length with one or more slots in the fastener head and inserting one or more press pins into the one or more aligned grooves and slots allows for securing the threaded rod to the fastener head for preventing dislodgement of components of the fastener and locking the assembly in place.

DETAILED DESCRIPTION

A fastener system comprising a fastener and a driver is described herein. The fastener comprises a threaded section fixed to a top portion, or fastener head, and a spring-loaded plunger held within a length of the threaded section, fills a center driver hole in the top portion when at rest. When the specialized driver is coupled to the top portion and pushed against the plunger, the plunger compresses the spring, and a driver recess that engages with a driver head of the driver is revealed. This recess allows for coupling of the driver and the fastener and the transfer of torque from the driver to the fastener, allowing the fastener to be threaded into place. Magnets may be recessed into the driver head to hold the driver in place on the fastener as it is used.

The size and shape of the driver recess created by the depressed plunger is not limited to a simple slot, and could be complex gear or star shapes, or any aesthetically pleasing shape adding further to the decorative nature of the fastener system.

Tolerances between an inner perimeter of the recess on the fastener head and an outer perimeter of a surface of the plunger can be sufficiently tight such that a seam between the plunger and the screw head disappears when the plunger is pushed by the spring back into place within the recess after the driver is removed. These tight tolerances can be achieved by forming the fastener and the plunger with ultra-precision manufacturing processes like Wire electrical discharge machining, or Wire EDM. The resulting function-ality and look of the fastener according to embodiments described herein allows the fastener system to be used with a high end, flat pack furniture line, shelving units, or various other furniture and/or decorative or functional installations.

Moreover, the driver hole in the top portion of the fastener and the plunger head inserted therein, meet at a chamfer. The driver for depressing the plunger head and rotating the fastener for install and/or removal of the fastener in a substrate is provided with an undercut portion below the driver head. As such, when the driver head is inserted into the driver hole, or slot, in the fastener head and depresses the plunger, preserves the chamfered edge wherein the slot and plunger meet on the outer surface of the driver head as the driver transfers torque to the fastener for install and/or removal.

One embodiment of the fastener system 10 is illustrated generally in the figures. The system comprises a fastener 12 and a driver 14 that can be used in the construction of furniture 22, shelving units or various other installations and the like.

Figure 1:
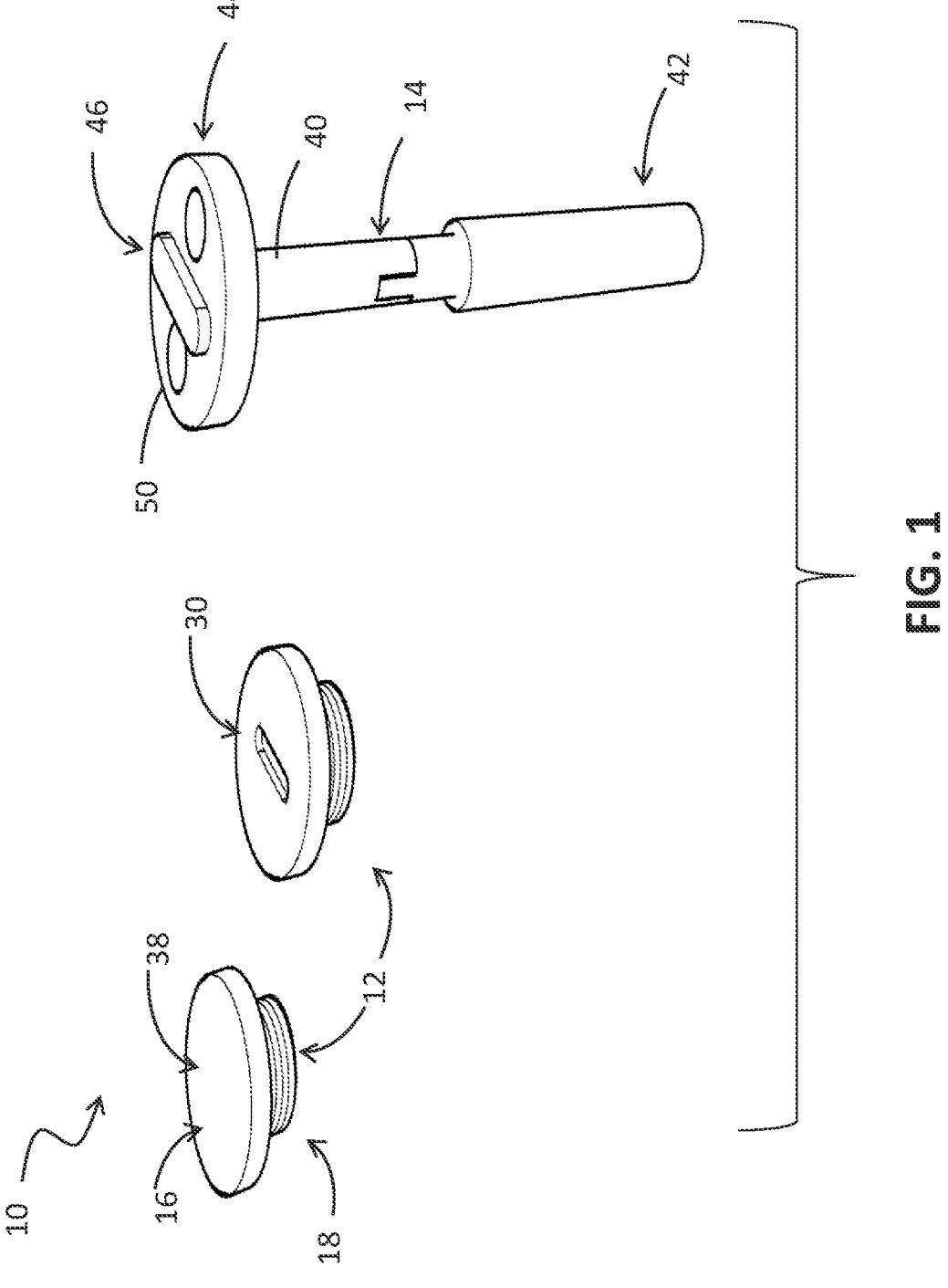
FIG. 1 is a perspective view of a fastener and plunger of a fastener system.
Figure 2:
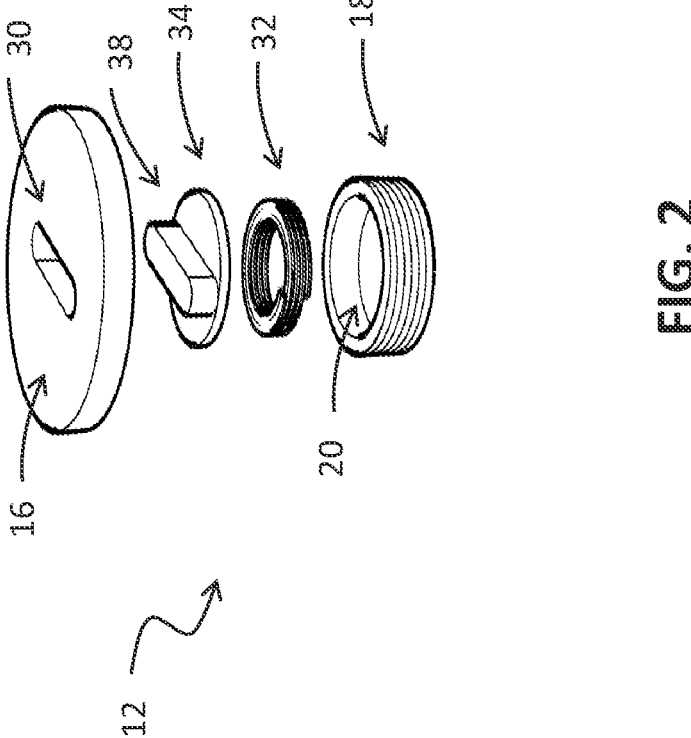
FIG. 2 is an exploded view of a fastener of the fastener of the system.

As illustrated in FIGS. 1-2, the fastener 12 may be a threaded fastener such as a screw. In the embodiment illustrated, the fastener comprises a fastener head 16 and a threaded length 18 extending from connection with the fastener head 16. The fastener head 16 may be a disk having a head thickness 18 and a head diameter 20. While the fastener head 16 illustrated is circular in shape, other geo-metric shapes for the base are contemplated and within the scope of this disclosure. In the embodiment illustrated, the fastener 12 is configured for installation in a flat, or sub-stantially flush manner, where the fastener is installed in a manner that it is flush with a surface of a substrate in which the fastener 12 is installed. In other decorative installations, the fastener may be installed in a manner wherein the fastener head sits above the substrate and thus alternative geometric shapes for the fastener head are contemplated and within the scope of this disclosure.

Extending outwardly from a bottom surface of the fas-tener head 16 is the threaded length 18. The threaded length 18 is externally threaded with an open inner cavity 20 along its length. The threaded length 18 may also be open at a terminal end opposite the fastener head 16. The threaded length 18 has an outer diameter. In the embodiment illus-trated, the outer diameter is less than the fastener head diameter. The fastener head 16 may also have an aperture 30 which is configured to removably couple the fastener 12 to the driver 14 for installation and/or removal of the fastener 12. In the embodiment illustrated, the aperture 30 is an elongated slot, however, alternative shapes for the aperture 30 are contemplated and within the scope of this disclosure.

The fastener system 10 further comprises a spring 32 and a plunger 34. The spring 32 and plunger 34 are configured to fit inside the open inner cavity 20 of the threaded length 18 of the fastener 12. The spring 32 is a compression spring and serves to aid in positioning and movement of the plunger 34. The spring 32 has dimensions that allow the spring to fit within the inner cavity 20 and compress and relax therein. The plunger 34 is a disk having a diameter and a protrusion 38 also referred to as a plug 38, on an outer surface of the disk wherein the protrusion 38 has perimeter dimensions that match the inner dimension of the aperture 30 in the fastener 12. The tolerance between the perimeter of the plug 38 and the inner surface of the aperture 30 are sufficiently tight to obscure any seam when the plug 38 is engaged in the aperture 30 and thus the top surface of the fastener head 16 is substantially smooth and flat.

In another embodiment as shown in FIGS. 3A-4C, the plunger 34 comprises a base 33 having a diameter and a protrusion 38 or plug 38 extending from an end of the base 33. The protrusion 38 has perimeter dimensions that match the inner dimension of the aperture 30 in the fastener head 16 and the plunger 34 and the aperture 30 meet at a chamfered edge 35. The protrusion includes a chamfer 35 connecting a height of the protrusion to the flat upper surface 37 of the protrusion 38. Similarly, an upper edge of the aperture 30 includes a chamfer 31. The tolerance between the perimeter of the plug 38 and the inner surface of the aperture 30 are sufficiently tight to obscure any seam when the plug 38 is engaged in the aperture 30 and thus the top surface of the fastener head 16 is substantially smooth and flat.

Figures 4A, 4B, 4C:
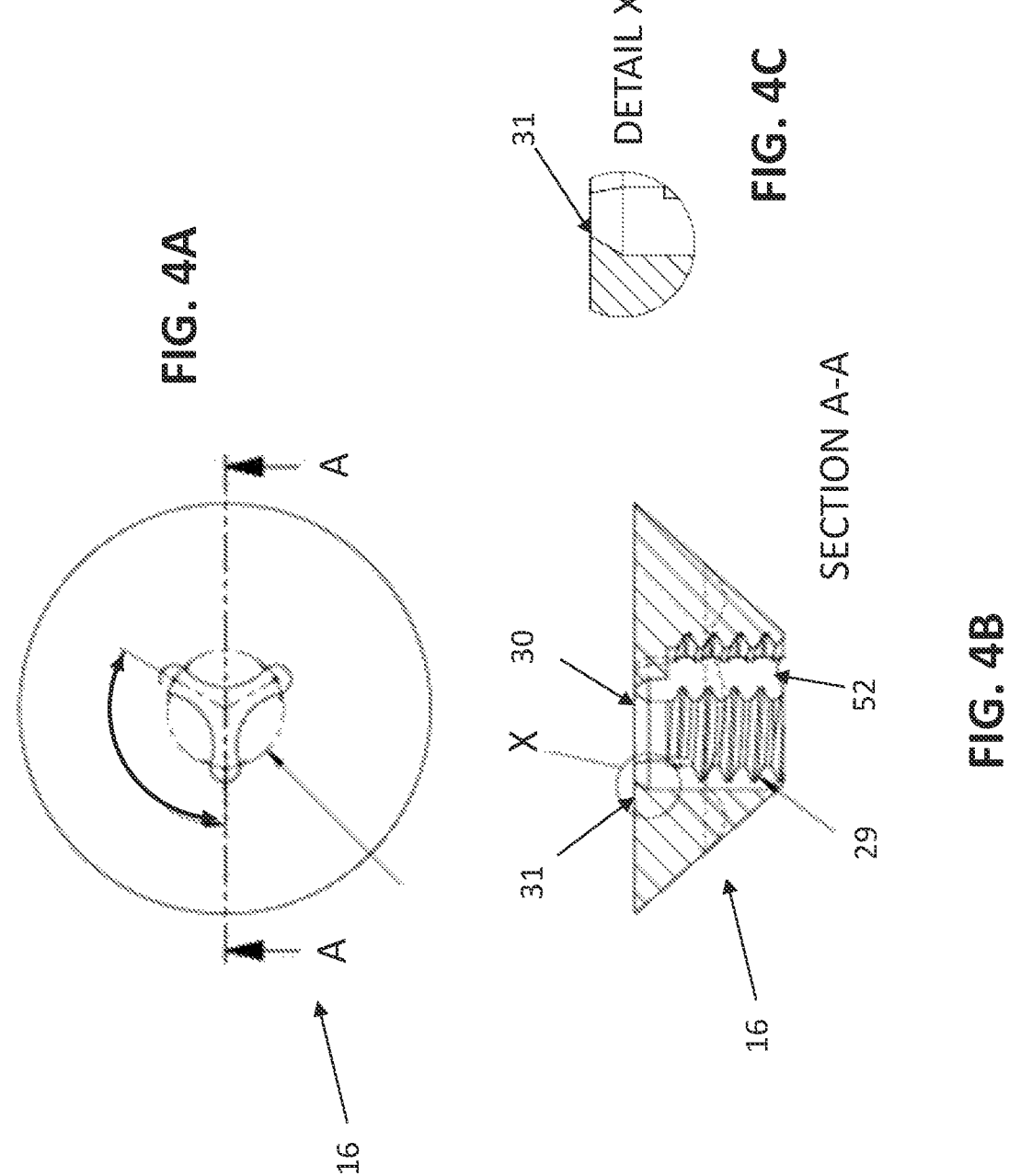
FIG. 4A is a top view of a fastener head of the fastener system and FIG. 4B is a cross-sectional view thereof along line A-A in FIG. 4A, with FIG. 4C showing the detail of X identified in FIG. 4B.

As shown in FIGS. 4B and 4C, the aperture 30 may further have internal threads 29 along the bottom length of the fastener head 16 for coupling to the threaded end 18 in embodiments wherein the fastener head 16 and threaded length 16 are produced by difference methods of construc-tion as discussed in further detail below. This length of internal threads 29 allows for production of the fastener 10 in a manner than allows for an invisible seal to be formed by the plug 38 and provided in the aperture 30 when the chamfered edges 31, 35 of each meet. The length of internal threads 19 in the aperture 30 may also be provided with one or more grooves 52 which may align with a wing of the protrusion 38 shape for receiving a pin(s) 54 to secure the threaded length 18 of the fastener to the fastener head 16 and lock the components together for co-rotation.

Figures 5A, 5B, 6:
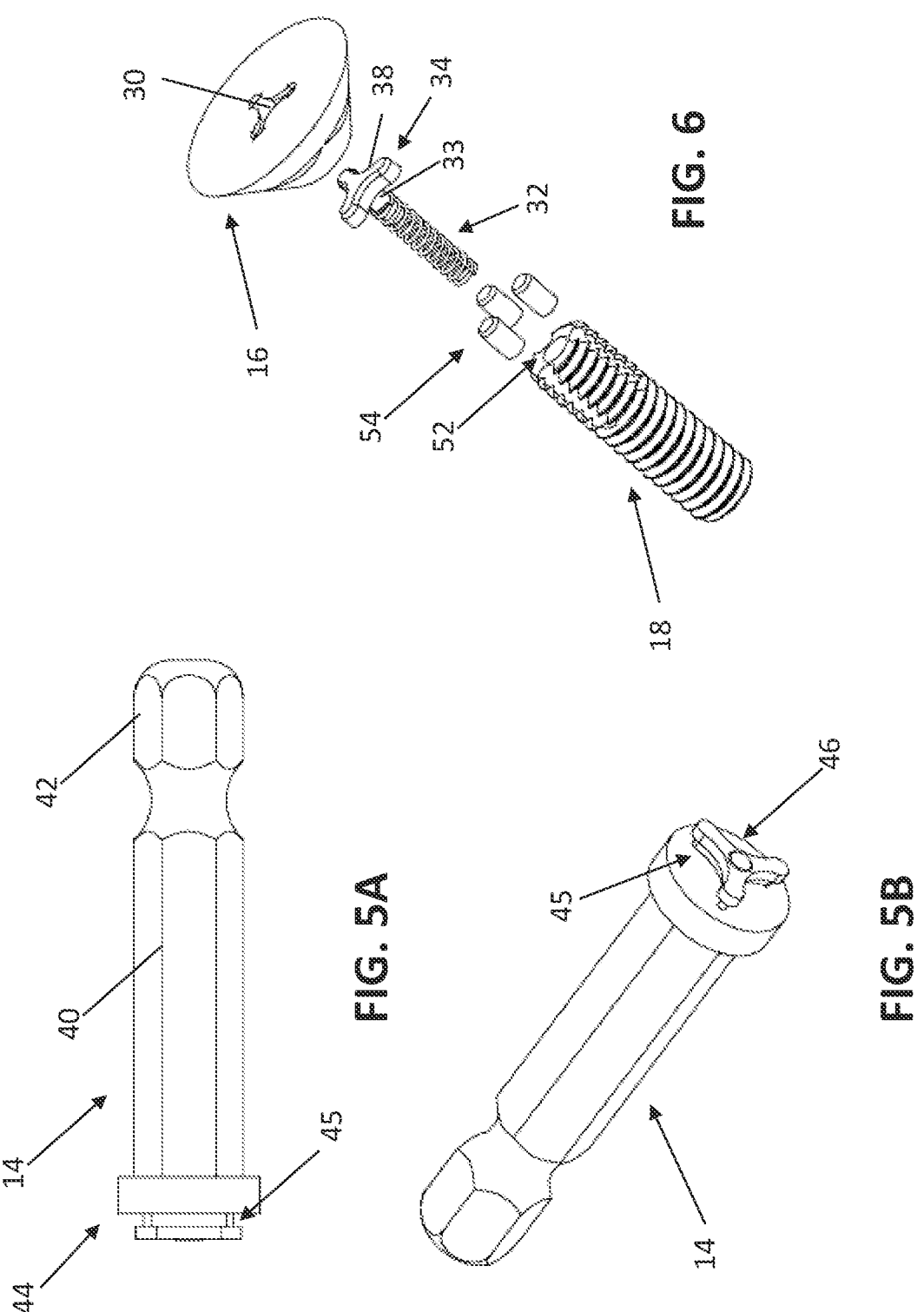
FIG. 5A is a side view of a driver for the fastener system of FIGS. 3A-4C and FIG. 5B is a perspective view thereof.
FIG. 6 is an exploded view of the fastener of the fastener system of FIGS. 4A-5B.
Figure 7:
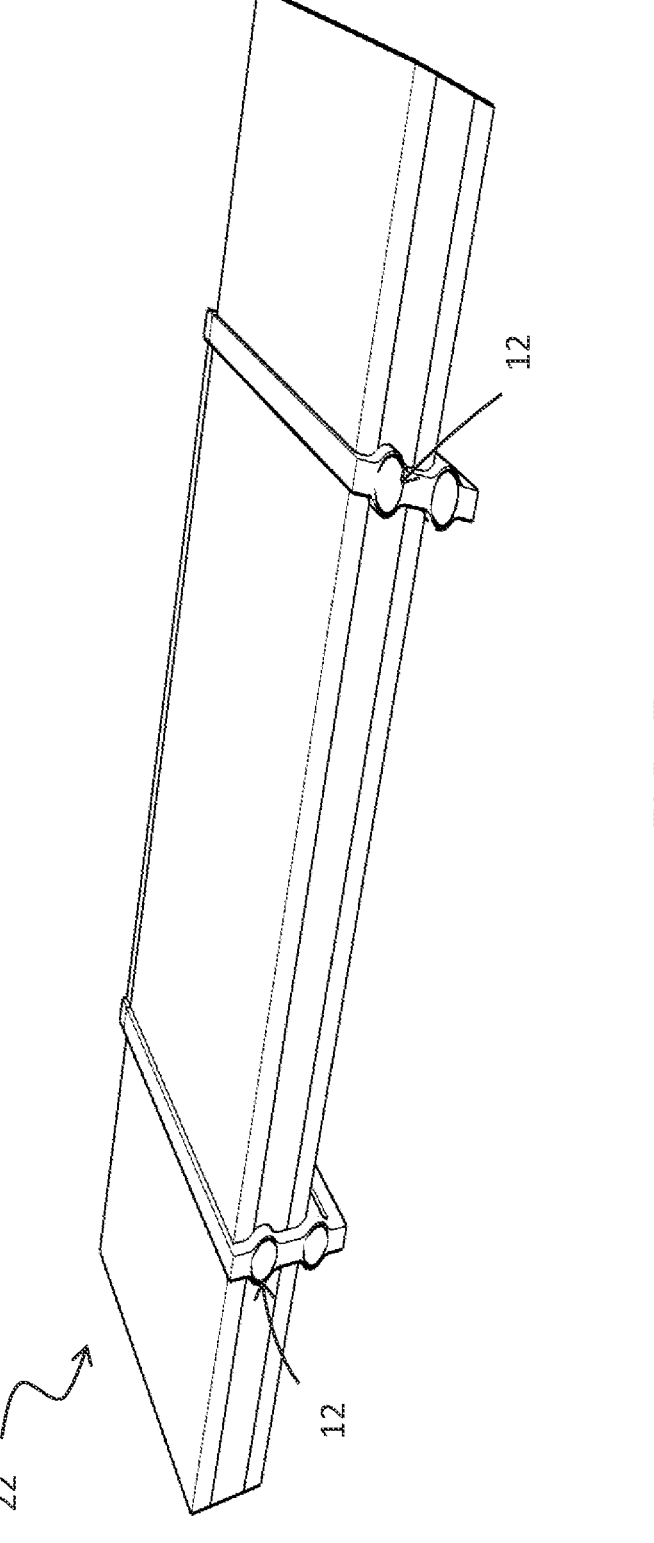
FIG. 7 is a perspective view of the fastener installed in a furniture construction.

The driver 14 is configured to install the fastener 12 for use. Thus, the driver 14 is configured to removably couple to the fastener 12 and provide torque to the fastener 12. In general as shown in FIGS. 2, 5A and 5B, the driver 14 has a shaft 40 extending between a grip end 42 and a driver head 44. The grip end 42 may have a textured end, handle, or other end effector allowing a user to grab and use the driver 14. In the embodiment illustrated in FIG. 2, the driver head 44 may be a disk having dimensions similar to the fastener head 16 for coupling the driver head to the fastener head. The driver head 44 has a protrusion 46 extending outwardly from the driver head 44 and an undercut surface 45 for preservation of and preventing damage to the fastener when transferring torque thereto via the aperture 30 and its chamfered edge. The protrusion 46 has dimensions, such as a height and outer perimeter shape which allow the protrusion 46 to fit into and mate with the aperture 30 in the fastener 12.

In the embodiment illustrated in FIGS. 5A-5B, the driver 14 has a grip end 42 and a driver head 44. The driver head 44 comprises a protrusion 46 having a shape to substantially match the protrusion 38 of the plunger and the aperture 30 in the fastener head 16. The driver head 44 comprises an undercut 45 below the protrusion 46, as this undercut allows the driver 14 movement, such as forward or side movement against the chamfered edge 31 of the aperture 30 and/or the chamfered edge 35 of the plunger 34 to protect the fastener 12 from damage as the driver 14 transfers torque from a user to the threaded rod 18 of the fastener 12.

Figure 3B:
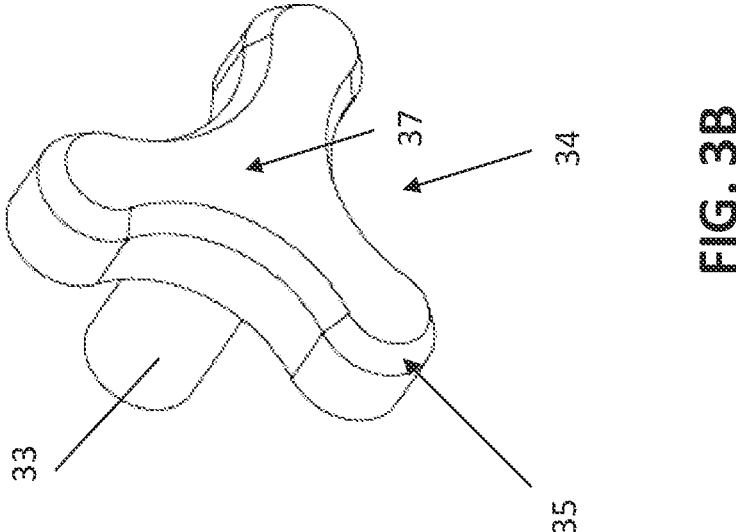
FIG. 3A is a side view of another plunger of a fastener system and FIG. 3B is a perspective view thereof.
Figure 3A:
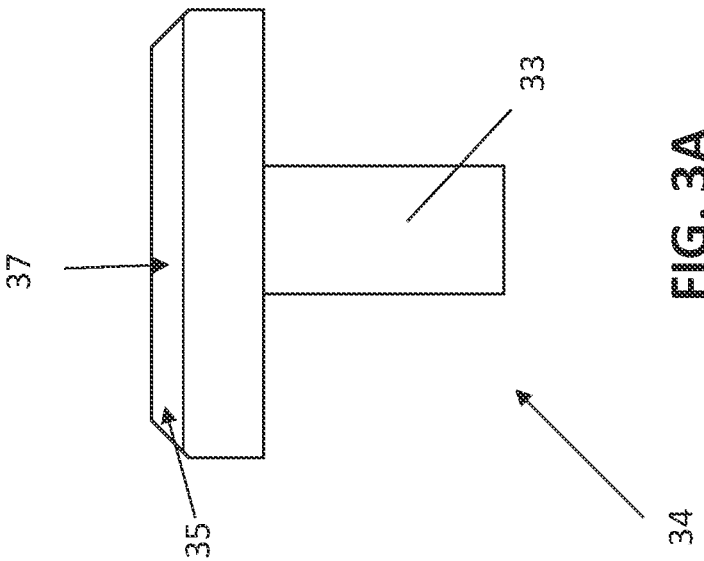

In one or more of the embodiments described herein, when inserted into the fastener head 16, the protrusion 46 catches and couples to the aperture 30, allowing rotation of the driver 14 to rotate the fastener 12 via frictional engagement. The protrusion 46 may also push down the plunger 34, moving the plunger 34 into the inner cavity 20 along the threaded length 18 and concurrently compressing the spring 32 while driving the fastener 12 into a substrate for installation of the fastener 12. The chamfered edges of the aperture 30 and plunger 34 in combination with the undercut surface 45 of or below the protrusion 46 prevent damage to the fastener 12 when transferring torque from the driver 14 to the fastener 12. When the fastener 12 is installed, the driver 14 is uncoupled from the fastener 12 and the protrusion 46 removed from the aperture 30. As the driver 14 is uncoupled from the fastener head 16, the spring 32 relaxes and pushes against the plunger 34 to push the plunger 34 towards to fastener head 16 and thus move the plug 38 into the aperture 30 providing the substantially smooth and flat outer surface of the fastener head 16 as illustrated in FIG. 3. As the seam between the aperture 30 and the plug 38 is substantially obscured, the fastener head 16 appears as a solid, singular object.

The driver 14 may additionally couple to the fastener. In the embodiment illustrated, the driver head 44 is provided with one or more magnets 50 to magnetically couple the driver 14 to the fastener 12.

The fastener 12 and plunger 34 may be comprised of aluminum, steel, stainless steel, titanium, or a like metal or metal alloy. The driver head 44 may be similarly constructed.

In one embodiment, the fastener as shown in FIGS. 3A-6, the fastener comprises a threaded rod 18 having an interior cavity and one or more grooves 52 in the threaded length 18 for receiving one or more press pins 54 for securing the threaded rod 18 to the fastener head 16. The spring 32 is positioned between the threaded rod 18 and the plunger 34. As shown, the spring 32 is provided within the cavity of the threaded rod 18 and is compressed and relaxed therein. The spring 32 further couples to the base 33 of the plunger 34, for example, allowing the base 33 to fit within the interior of the spring and the top of the spring 32 contacting an underside of the protrusion or plug 38. The protrusion or plug 38 is then inserted into the fastener head 16 from a bottom of the aperture 30 and the threaded rod 18 connected to the fastener head 16 with the plunger 34 and spring 32 therebetween as the threaded rod engages with interior threads 29 on the fastener head 16. The pins 54 then secure the threaded rod 18 to the fastener head 16 in a manner that prevents dislodgement of the components and locks the assembly in place.

In producing the fastener 12 of one or more embodiments, the fastener 12 may be subject to a grinding and final assembly process wherein the fastener head 16 and plunger 34 may be ground together, for example with medium course media, while the plunger 34 is firmly pressed against the back side of the fastener head 16. The spring 32 provides insufficient pressure for this grinding operation, so the threaded section 29 of the fastener head 16 may be screwed into the threaded rod 18 until it contacts the plunger 34 and presses firmly into the fastener head 16. The grind can then proceed, and after the grind is complete the threaded section 19 can be unscrewed partially and/or to the overall final length specification of the fastener 12 with threaded rod grooves 52 and screw head lobes 52 matching, and then the pin 54 press fit can be completed to lock the fastener head 16 and threaded rod 18 together.

Although the present disclosure has been described with reference to preferred embodiments, workers skilled in the art will recognize that changes may be made in form and detail without departing from the spirit and scope of the disclosure.

The invention claimed is:

1. A fastener system comprising:
a fastener head having an aperture therein for receiving a head of a plunger;
a fastener body having an externally threaded length and an open cavity along a length thereof;
a driver having driver head with a protrusion thereon with dimensions of the protrusion substantially matching dimensions of the aperture in the fastener head and the driver having an undercut portion between the driver head and protrusion thereof allowing for transfer of torque from the driver to the fastener head without damage thereto,
wherein the plunger head is slidable within a depth of the aperture of the fastener head from a first position wherein a top surface of the head of the plunger is flush with a top surface of the fastener head thus obscuring the aperture in the fastener head and a second position wherein the top surface of the head of the plunger is below the top surface of the fastener head.

2. The fastener system of claim 1 wherein the aperture in the fastener head has a chamfer along a perimeter thereof.

3. The fastener system of claim 2 wherein a perimeter of the head of the plunger has a chamfer there along and wherein in the head of the plunger and the aperture in the fastener meet at the respective chamfers.

4. The fastener system of claim 1 and further comprising a spring for biasing the plunger, the spring having a first length positioned within a portion of the open cavity along the length of the fastener body.

5. The fastener system of claim 4 and a second length of the spring coupled to a base of the plunger.

6. The fastener system of claim 1 wherein the threaded length of the fastener body is fixedly secured to the fastener head with the cavity in the fastener body aligned with the aperture in the fastener head.

* * * * *